(12) United States Patent
Sugimoto

(10) Patent No.: US 8,056,701 B2
(45) Date of Patent: Nov. 15, 2011

(54) CONVEYANCE DEVICE USING CARRIAGE

(75) Inventor: Katsuhiro Sugimoto, Shiga (JP)

(73) Assignee: Daifuku Co., Ltd. (JP)

( * ) Notice: Subject to any disclaimer, the term of this patent is extended or adjusted under 35 U.S.C. 154(b) by 364 days.

(21) Appl. No.: 12/377,313

(22) PCT Filed: Jan. 29, 2008

(86) PCT No.: PCT/JP2008/051279
§ 371 (c)(1),
(2), (4) Date: Feb. 12, 2009

(87) PCT Pub. No.: WO2008/093667
PCT Pub. Date: Aug. 7, 2008

(65) Prior Publication Data
US 2010/0224464 A1    Sep. 9, 2010

(51) Int. Cl.
*B61B 13/12* (2006.01)
*B61D 47/00* (2006.01)

(52) U.S. Cl. .................. 198/463.3; 187/211; 198/468.6; 198/801

(58) Field of Classification Search ............... 198/463.3, 198/468.6, 801; 414/427, 663, 391, 917; 187/211, 269; 104/128
See application file for complete search history.

(56) References Cited

U.S. PATENT DOCUMENTS

| | | | | |
|---|---|---|---|---|
| 4,911,281 A * | 3/1990 | Jenkner | | 198/364 |
| 5,513,936 A * | 5/1996 | Dean | | 414/273 |
| 6,105,749 A * | 8/2000 | Block et al. | | 198/370.03 |
| 7,077,620 B2 * | 7/2006 | Ishioka | | 414/749.1 |
| 7,134,541 B2 * | 11/2006 | Matsubara et al. | | 198/468.01 |
| 7,178,660 B2 * | 2/2007 | Dehne et al. | | 198/463.1 |
| 7,458,455 B2 * | 12/2008 | Nakamura et al. | | 198/463.3 |
| 7,658,273 B2 * | 2/2010 | Nakamura et al. | | 198/414 |
| 7,658,275 B2 * | 2/2010 | Hayashi | | 198/459.8 |
| 7,731,013 B2 * | 6/2010 | Milner et al. | | 198/468.6 |

FOREIGN PATENT DOCUMENTS

JP        2006-62805        3/2006

* cited by examiner

*Primary Examiner* — Douglas Hess
(74) *Attorney, Agent, or Firm* — St. Onge Steward Johnston & Reens LLC

(57) ABSTRACT

The present invention increases an allowable maximum weight of an object to be loaded on a conveyance device using a carriage including an object support base movable vertically controlled by cam rails on the floor side without increasing the weight of the conveyance carriage itself, and is characterized in that the object support base 11 is supported movably vertically on a conveyance carriage 1 via a crosslink mechanism 10, the crosslink mechanism 10 is provided with an elevating cam follower roller 32 which moves up and down in conjunction with standing and falling movements of the crosslink mechanism 10, and in a conveyance carriage traveling path, a cam rail 50 which pushes up the elevating cam follower roller 32 is provided, wherein an urging means 45 which urges the object support base 11 upward is provided, and an urging force of the urging means 45 is set so as to move up the object support base 11 when no object is loaded on the object support base 11, however, when an object is loaded on the object support base 11, to allow the object support base 11 to lower according to the load of the object.

14 Claims, 10 Drawing Sheets

CONVEYANCE DEVICE USING CARRIAGE

TECHNICAL FIELD

The present invention relates to a conveyance device using a carriage which includes an object support base movable vertically controlled by cam rails on the floor side.

BACKGROUND ART

Such a conveyance device using a carriage, that is, a conveyance device using a carriage including an object support base movable vertically supported via a crosslink mechanism on a conveyance carriage that can travel on a fixed traveling path, elevating cam follower rollers which move up and down in conjunction with standing and falling movements of the crosslink mechanism and is provided on the bottom of the conveyance carriage, and cam rails which push up the elevating cam follower rollers and are provided in the conveyance carriage traveling path, is conventionally known as disclosed in Patent document 1, etc. [Patent document 1] Japanese Published Unexamined Patent Application No. 2006-62805

DISCLOSURE OF THE INVENTION

Problem to be Solved by the Invention

In the conveyance device using a carriage constructed as described above, when the object support base on which an object is loaded is positioned higher than its lowering limit position, that is, when the cam follower rollers push up the crosslink mechanism so as to stand it up by the cam rails, to steady the object support base at a predetermined height, the weight of the conveyance carriage must exceed an upward reaction force (buoyancy) applied to the fulcrums (position-fixed link end and sliding link ends) on the conveyance carriage side of the crosslink mechanism. In other words, if the weight of the object loaded on the object support base increases and the upward reaction force (buoyancy) applied to the fulcrums on the conveyance carriage side of the crosslink mechanism becomes greater than the weight of the conveyance carriage, the conveyance carriage itself floats up and changes the crosslink mechanism into a fall-down posture. From this fact, to realize conveyance of a heavy object by the conveyance device using a carriage constructed as described above, the weight of the conveyance carriage itself must be made sufficiently heavy. If the weight of the object loaded on the object support base increases, when the elevating cam follower rollers are pushed up by the cam rails, the surface pressure to be applied to these rollers also increases according to the loading weight, so that in order to reduce this surface pressure increase, the diameters of the elevating cam follower rollers must be increased, and this obstructs realization of a low-floor structure of the conveyance carriage.

Means for Solving the Problem

An object of the present invention is to provide a conveyance device using a carriage with an elevating loading platform which can solve the conventional problem described above, and indicating the means by the reference numerals of the embodiment described later, in the construction described in a first aspect, a conveyance device using a carriage includes an object support base 11 supported movably vertically via a crosslink mechanism 10 on a conveyance carriage 1 capable of traveling on a fixed traveling path, elevating cam follower rollers 30a, 30b, and 32 which move up and down in conjunction with standing and falling movements of the crosslink mechanism 10, provided in the crosslink mechanism 10, and elevating cam rails 50 and 52 which push up the elevating cam follower rollers 30a, 30b, and 32, provided in the traveling path of the conveyance carriage 1, wherein an urging means 45 which urges the object support base 11 upward is provided, and an urging force of the urging means 45 is set to a strength which moves up the object support base 11 when no object is loaded on the object support base 11, but allows the object support base 11 to lower according to a load of an object when the object is loaded on the object support base 11.

To carry out the present invention constructed as described above, in detail, as described in a second aspect, the urging means 45 may be made of a horizontal coil spring (compression coil spring 48) which is interposed between a sliding link end (common sliding fulcrum shaft 24) on the object support base 11 side in the crosslink mechanism 10 and the object support base 11 and urges the crosslink mechanism 10 so as to stand it up. In this case, as described in a third aspect, it is possible that the crosslink mechanism 10 is constituted by a pair of crosslinks 12a and 12b arranged parallel, and sliding link ends on the object support base 11 side of the pair of crosslinks 12a and 12b are joined to each other by a joint shaft (common sliding fulcrum shaft 24), and to this joint shaft (common sliding fulcrum shaft 24), one ends of a plurality of pulling shaft rods 47 arranged parallel in the horizontal posture orthogonal to the joint shaft (common sliding fulcrum shaft 24) are joined, and the object support base 11 is provided with a support member 49 which supports the pulling shaft rods 47 movably axially, and the crosslink mechanism 10 is urged to stand up by compression coil springs 48 that fit around the pulling shaft rods 47 between the support member 49 and free end side spring bearings 47b of the respective pulling shaft rods 47.

When the construction described in the second or third aspect is employed, as described in a fourth aspect, the urging force of the urging means 45 can be set to a strength which cannot move up the object support base 11 at the lowering limit position in a state that no object is loaded on the object support base 11, but can move up the object support base 11 from a predetermined height position to a rising limit position when the object support base 11 rises from the lowering limit position to the predetermined height, and depending on the circumstances, as described in a fifth aspect, the urging force of the urging means 45 can be set to a strength which can move up the object support base 11 having no object loaded thereon from the lowering limit position to the rising limit position. In particular, when the construction described in the fifth aspect is employed, as described in a sixth aspect, the urging means can be constituted by a main urging means 45 which moves up the object support base 11 that has risen to a predetermined height from the lowering limit position to the rising limit position in a state that no object is loaded on the object support base 11, and auxiliary urging means 53 which moves up the object support base 11 at the lowering limit position to the predetermined height position.

To carry out the invention described in the first through sixth aspects, as described in a seventh aspect, as the elevating cam follower rollers 30a, 30b, and 32, first cam follower rollers 30a and 30b directly axially supported on the links 13a and 14a of the crosslink mechanism 10 and a second cam follower roller 32 axially supported on a folding portion of a toggle link 31 interposed between the links 13b and 14b of the crosslink mechanism 10 and the conveyance carriage 1 side, can be provided, and as the elevating cam rails 50 and 52, a first cam rail 52 which pushes up the object support base 11 to an intermediate height via the first cam follower rollers 30a and 30b, and a second cam rail 50 which pushes up the object support base 11 from the intermediate height to the rising limit position via the second cam follower roller 32, can be provided.

Further, to carry out the invention described in the first through seventh aspects, as described in a eighth aspect, parallel to the crosslink mechanism 10, an automatic lock means 39 which holds the crosslink mechanism 10 in a standing posture in which the object support base 11 reaches the rising limit position can be provided, and this automatic lock means 39 can be provided with an unlocking cam follower roller 44.

When the urging means described in the first aspect is provided, to increase the loading efficiency on a truck in the case of transportation of the conveyance carriage on a truck, when the object support base having no object loaded thereon is steadied at a lowered position (lowering limit position or a position near the lowering limit position) to lower the height of the conveyance carriage, the object support base lowered against the urging force must be bound with a wire rope or the like, and regardless of this operation, it is expected that the object support base vigorously jumps up according to the urging force of the urging means when the wire rope is unbound. When the urging means described in the second aspect is employed, according to reduction in standing angle of the crosslink mechanism, in other words, the lower the level of the object support base becomes, the smaller the urging force of the urging means to push up straightly the object supporting base becomes so that when the object support base reaches the lowered position the weight of the object support base exceeds the urging force, however, the object support base at the lowered position is very unstable, and only slight lifting of the object support base causes the object support base to vigorously jump up according to the urging force of the urging means.

The present invention provides a conveyance device using a carriage which can solve the above-described problem. Specifically, to carry out the invention described in the first through eighth aspects, as described in a ninth aspect, it is possible that a jig 60 which holds the object support base 11 at a lowered position against the urging force of the urging means is provided, and this jig 60 is provided with an operating screw member (operating nut 63) which allows the object support base 11 to move up according to the urging force corresponding to a rotating operation amount.

To carry out the invention described in the ninth aspect, in detail, as described in a tenth aspect, the jig 60 can be removably attached to the conveyance carriage 1, however, instead of removably attaching of the jig 60 itself, as described in a eleventh aspect, it is possible that, in a state that the operating screw member (operating nut 63) is rotated until the object support base 11 reaches the rising limit position or the operating screw member (operating nut 63) is removed, the object support base 11 is allowed to move vertically between the lowering limit position and the rising limit position without a rotating operation of the operating screw member (operating nut 63).

In addition, as described in a twelfth aspect, it is possible that the object support base 11 is supported movably vertically on the conveyance carriage 1 via the crosslink mechanism 10, the crosslink mechanism 10 is provided with a pair of left and right crosslinks 12a and 12b and a common sliding fulcrum shaft 19 which joins sliding link ends on the conveyance carriage 1 side of both crosslinks 12a and 12b, and the jig 60 includes a screw shaft 61 joined to the common sliding fulcrum shaft 19 side, a support member 62 which is provided on the conveyance carriage 1 by the side of the object support base 11 and the screw shaft 61 penetrates through, and an operating nut 63 which is screw-fitted on the free end side of the screw shaft 61 penetrating the support member 62, and the object support base 11 lowers according to a tightening operation of the operating nut 63.

When the construction described in the twelfth aspect is employed, as described in a thirteenth aspect, it is possible that a cylindrical body 64 is freely fitted around the common sliding fulcrum shaft 19 so as to rotate on its own axis, an intermediate bar-like member 66 is disposed parallel to the cylindrical body 64 at an intermediate position between the cylindrical body 64 and the support member 62, the intermediate bar-like member 66 and the cylindrical body 64 are joined by joint rods 65a and 65b at two positions axially of the cylindrical body 64, an inner end of the screw shaft 61 is attached to the intermediate bar-like member 66 at an intermediate position between the two joint rods 65a and 65b, and the support member 62 is axially supported on a bearing member 73 stood on the conveyance carriage 1 side rotatably around a support shaft 62b parallel to the cylindrical body 64. In this case, as described in a fourteenth aspect, it is possible that the cylindrical body 64 is provided with a joint rod connector 64a which removably connects the two joint rods 65a and 65b, and the bearing member 73 is removably attached to the conveyance carriage 1, and the jig 60 including the two joint rods 65a and 65b, the intermediate bar-like member 66, the screw shaft 61, the operating nut 63, the support member 62, and the bearing member 73 is made removable from the conveyance carriage 1.

Effects of the Invention

According to the conveyance device using a carriage constructed as described in the first aspect, an empty object support base on which no object is loaded is in a state pushed-up to the rising limit position by the urging force of the urging means, so that an object will be loaded on this object support base at the rising limit position. In this case, if it is inconvenient that the object support base is lowered by a load, cam rails which push up the object support base to the rising limit position via the elevating cam follower rollers is laid on the object loading station, or the object support base is held at the rising limit position by employing the automatic lock means described in the eighth aspect. The height of the object support base when the conveyance carriage travels in a work zone in which part assembly is performed for the loaded object after leaving the object loading station can be set to a height preferable for the work to be applied to the loaded object by pushing up the elevating cam follower rollers to a required height by the laid cam rails. In other words, in a zone in which the cam rails are not laid, the object support base on which an object is loaded is lowered to the lowering limit position by the weight of the object exceeding the urging force of the urging means, and in a zone in which the cam rails are laid, the conveyance carriage travels while the object support base is held at a height corresponding to the pushed-up height of the elevating cam follower rollers by the cam rails, the rising limit position, or an arbitrary height lower than the rising limit position.

Thus, according to the conveyance device using a carriage of the invention described in the first aspect, the object support base is urged to move up by the urging means, so that by this upward urging force, the loading weight when loading the object can be reduced. Therefore, even in the case where the upward reaction force (buoyancy) applied to the fulcrums on the conveyance carriage side of the crosslink mechanism becomes greater than the conveyance carriage own weight due to a great loading weight in the conventional conveyance device using a carriage which does not include the urging means and the conveyance carriage itself floats up, the loading weight is reduced, and accordingly, application of buoyancy to the conveyance carriage is suppressed and the object support base can be reliably held at a predetermined height or raised to the predetermined height. In other words, the maximum weight of the object that the conveyance device can handle can be increased while the conveyance carriage itself is made comparatively light in weight and small in size. Further, the loading weight to be applied to the elevating cam follower rollers can be reduced, so that the surface pressure applied to the rollers can be reduced, and the diameters of the elevating cam follower rollers can be reduced, and this is advantageous for constructing a low-floor structure of the conveyance carriage.

According to the construction described in the second aspect, the urging means can be easily constituted by using a horizontal space below the object support base between the sliding link ends and position-fixed link ends on the object support base side of the crosslink mechanism and a coil spring with a sufficient length, and in particular, according to the construction described in the third aspect, a powerful urging means can be easily constituted by using a plurality of compression coil springs. Further, according to the construction described in the fourth aspect, the object support base on which no object is loaded can be steadied at the lowering limit position, so that when it is advantageous that the object support base is lowered to the lowering limit position to reduce the height of the conveyance carriage at the time of transportation, etc., of this carriage on a truck or the like to a loading location, the object support base is only lowered to the lowering limit position according to an appropriate method, and it is not necessary to also use a fixing means for fixing the object support base that tries to move up responsively to the urging force of the urging means at the lowering limit position. Even when the fixing means for fixing the object support base at the lowering limit position is also used for safety, the fixing operation can be performed more easily than in the case where the object support base that tries to move up responsively to the urging force of the urging means must be fixed while being pressed against the lowering limit position. On the contrary, according to the construction described in the fifth aspect, the object support base on which no object is loaded cannot be stably held at the lowering limit position unless the fixing means is also used, however, when the construction capable of steadying the object support base on which no object is loaded at the lowering limit position is employed, if some external force is applied upward to the object support base steadied at the lowering limit position, there is no possibility that a dangerous situation where the object support base unexpectedly jumps up due to the urging force of the urging means occurs, and the safety can be improved.

When the construction described in the fifth aspect is employed, according to the construction described in the sixth aspect, the urging force of the main urging means can be made small so as to adapt to the weight of an object to be handled so that the object support base on which no object is loaded becomes steady at the lowering limit position when only the urging force of the main urging means is applied, and in addition, the urging force of the auxiliary urging means can prevent the object support base on which no object is loaded from becoming steady at the lowering limit position, so that the working effect in the case employing the construction described in the fifth aspect can also be obtained at the same time.

According to the construction described in the seventh aspect, in comparison with the construction in which the object support base is pushed up to the rising limit position by only one cam follower roller, the cam rail height (height of the elevating space of the cam follower roller) can be reduced, so that in combination with the effect of reducing the diameter of the cam follower roller as one of the effects of the present invention, it becomes more easier to construct a low-floor structure of the conveyance carriage.

Further, according to the construction described in the eighth aspect, the object support base can be locked at the rising limit position without using the cam rails, so that the cost is reduced by omitting laying of cam rails in the object loading station or the work zone or the like in which the conveyance carriage is made to travel while holding the object support base at the rising limit position, and this construction also contributes to a reduction in traveling resistance of the conveyance carriage.

According to the invention described in the ninth aspect, when the height of the conveyance carriage must be made low by holding the object support base at the lowered position against the urging force of the urging means as in the case of transportation on a truck, the object support base can be held at a lowered position by rotating the operating screw member of the provided jig, and when the conveyance carriage is installed on the conveyance path and then the object support base is restored into a vertically movable state, the object support base can be gradually raised by the urging force by rotating the operating screw member of the jig, so that the conventional troublesome and dangerous operation of binding the object support base lowered to a lowered position with a wire rope becomes unnecessary, and the operation of restoring the object support base into a usable state can be extremely safely performed. In this case, according to the construction described in the tenth aspect, after the conveyance carriage is installed on the conveyance path, the jig can be removed and reused for transportation of another conveyance carriage, and this is economical in comparison with the construction in which the jig is attached to all conveyance carriages which are required to hold their object support bases at the lowered positions.

According to the construction described in the eleventh aspect, even without removing the whole jig, by only rotating the operating screw member as a part of the jig until the object support base reaches the rising limit position or removing the operating screw member, as in the case where the jig is not provided, the object support base can be freely elevated between the lowering limit position and the rising limit position, so that in comparison with the case where the whole jig must be removed after the object support base is raised to the rising limit position, the operation for turning the conveyance carriage set on the traveling path into a usable state becomes comparatively easy.

When the present invention is applied to a general conveyance carriage having an object support base supported movably vertically thereon via a crosslink mechanism that includes a pair of left and right crosslinks, according to the construction described in the twelfth aspect, an operating nut that serves as the operating screw member of the jig is positioned on the conveyance carriage lateral to the object support base, so that the operation of releasing the holding of the object support base at the lowered position, that is, a reverse screwing operation of the operating nut is easily performed. This construction described in the twelfth aspect can also be utilized when the construction described in any of the ninth through eleventh aspects is employed.

When the construction described in the twelfth aspect is employed, according to the construction described in the thirteenth aspect, the inclination angle of the screw shaft can be changed along with a vertical movement of the object support base, so that setting can be made so that the position (height) on the conveyance carriage of the operating nut to be screw-fitted to the screw shaft is easily operated, and in addition, stress does not concentrate at one central point of the common sliding fulcrum shaft which join the sliding link ends on the object support base side of the pair of left and right crosslinks supporting the object support base, so that it is not necessary to make especially thick the common sliding fulcrum shaft for installation of the jig in the present invention. In other words, the present invention can be easily carried out by using the common sliding fulcrum shaft of the conventional conveyance device using a carriage in which the object support base is supported movably vertically by the pair of left and right crosslinks. Further, in this case, according to the construction described in the fourteenth aspect, removal of the whole jig is easily realized in the construction described in the thirteenth aspect.

BRIEF DESCRIPTION OF THE DRAWINGS

FIG. 14A is a longitudinal sectional side view showing a state before the object support base reaches the lowering limit position, and FIG. 14B is a longitudinal sectional side view showing a state that the object support base has reached the lowering limit position.

DESCRIPTION OF REFERENCE NUMERALS

Figure 1:
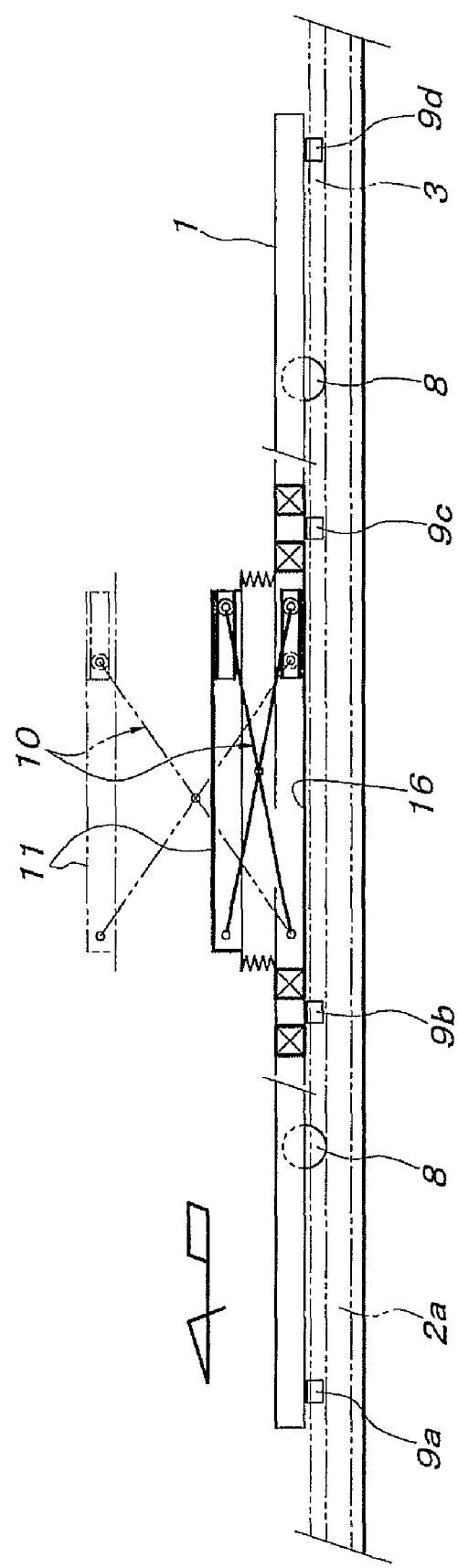
FIG. 1 is a schematic partial longitudinal sectional side view describing the whole construction of a conveyance carriage.

1: conveyance carriage
2a, 2b: guide rail
3: posture restricting guide rail
4: friction drive wheel
5: backup roller
8: wheel
9a-9d: vertical axis roller
10: crosslink mechanism
11: object support base
12a, 12b: crosslink
13a-14b: link
16: support frame
17, 22: bearing member
18, 23: position-fixed fulcrum shaft
19, 24: common sliding fulcrum shaft
20, 25: roller
21, 26: front-back slide guide
30a, 30b: (elevating) first cam follower roller
31: toggle link
32: (elevating) second cam follower roller
39: automatic lock means
40: locked portion
41: lock member
44: unlocking cam follower roller
45: urging means
46: urging unit
47: pulling shaft rod
48: compression coil spring
50: center cam rail (elevating second cam rail)
51: unlocking cam rail
52: side cam rail (elevating first cam rail)
53: auxiliary urging means
54: spring bearing member
55: rod
56: contact panel
57: compression coil spring
58: contact member
59: stopper bolt
60: jig
61: screw shaft
62: support member
62a: through hole
62b: support shaft
63: operating nut
64: cylindrical body
65a, 65b: joint rod (screw shaft)
66: intermediate bar-like member
67a, 67b: cylindrical body position-fixed ring
72: attaching plate
73: bearing member

BEST MODE FOR CARRYING OUT THE INVENTION

Figure 2:
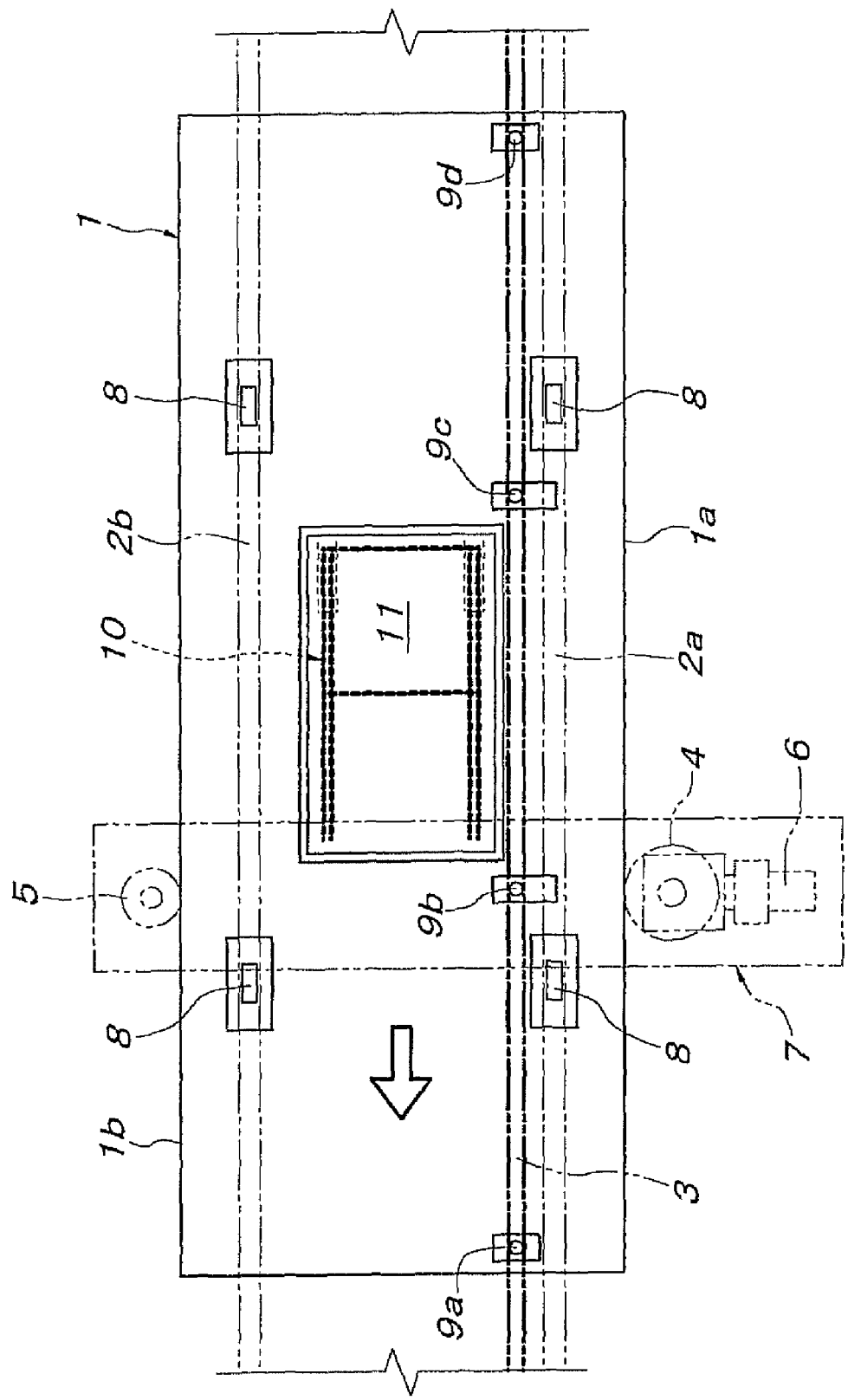
FIG. 2 is a schematic plan view describing the whole construction of the conveyance carriage.
Figure 3:
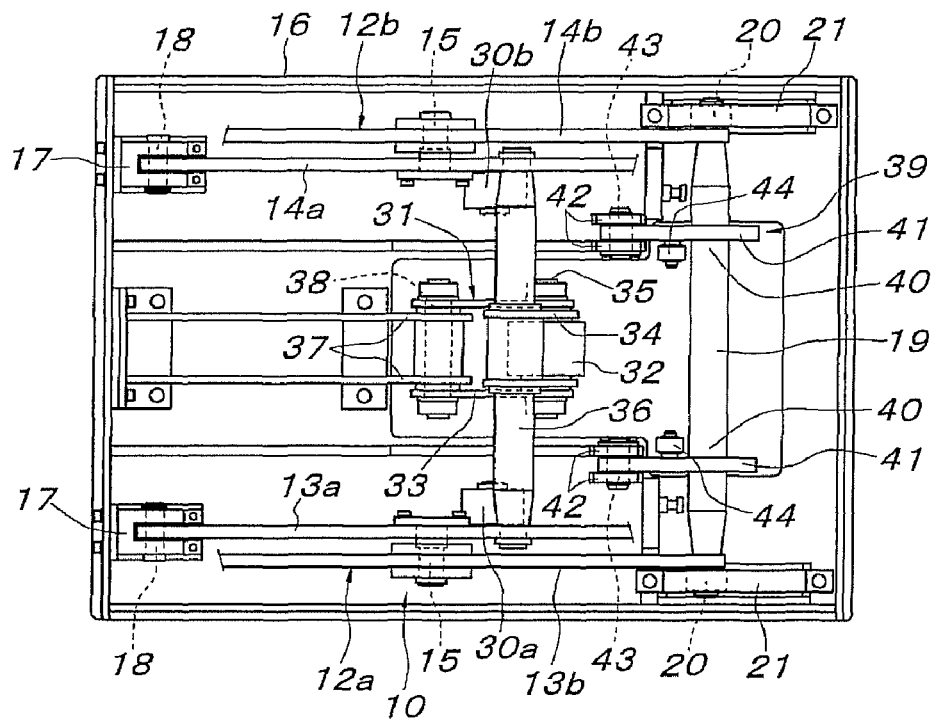
FIG. 3 is a cross sectional plan view showing a crosslink mechanism when an object support base is at a rising limit position.

A detailed embodiment of the present invention will be described hereinafter with reference to the accompanying drawings. In FIG. 1 and FIG. 2, the reference numeral 1 denotes a conveyance carriage which travels on a traveling path constituted by a pair of left and right supporting guide rails 2a and 2b laid on the floor surface and one posture restricting guide rail 3 laid close to one guide rail 2a parallel to the guide rails 2a and 2b. A traveling drive means for making the conveyance carriage 1 travel is not especially limited, however, in this embodiment, as shown by the imaginary lines in FIG. 2, a friction drive type traveling drive means 7 including a friction drive wheel 4 which comes into pressure contact with a friction drive surface 1a extending across the entire carriage length formed on one side surface parallel to the traveling direction of the conveyance carriage 1, a backup roller 5 which comes into contact with a backup surface 1b formed on the other side surface parallel to the traveling direction of the conveyance carriage 1 and sandwiches the conveyance carriage 1 between the same and the friction drive wheel 4, and a motor 6 which drives and rotates the friction drive wheel 4, is arranged at an appropriate position in the traveling path.

Figure 5:
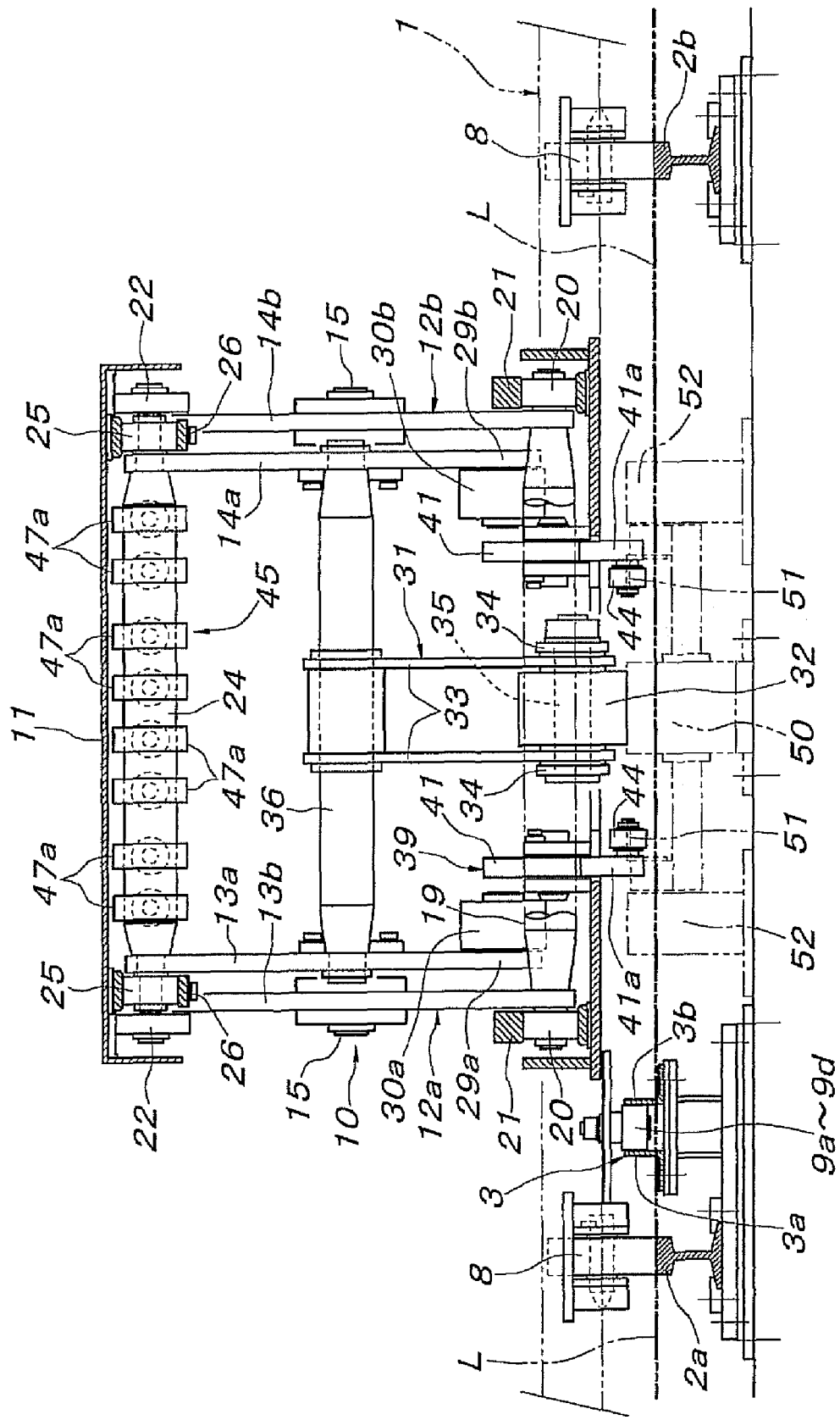
FIG. 5 is a longitudinal sectional back view showing a main portion when the object support base is at the rising limit position.
Figure 6:
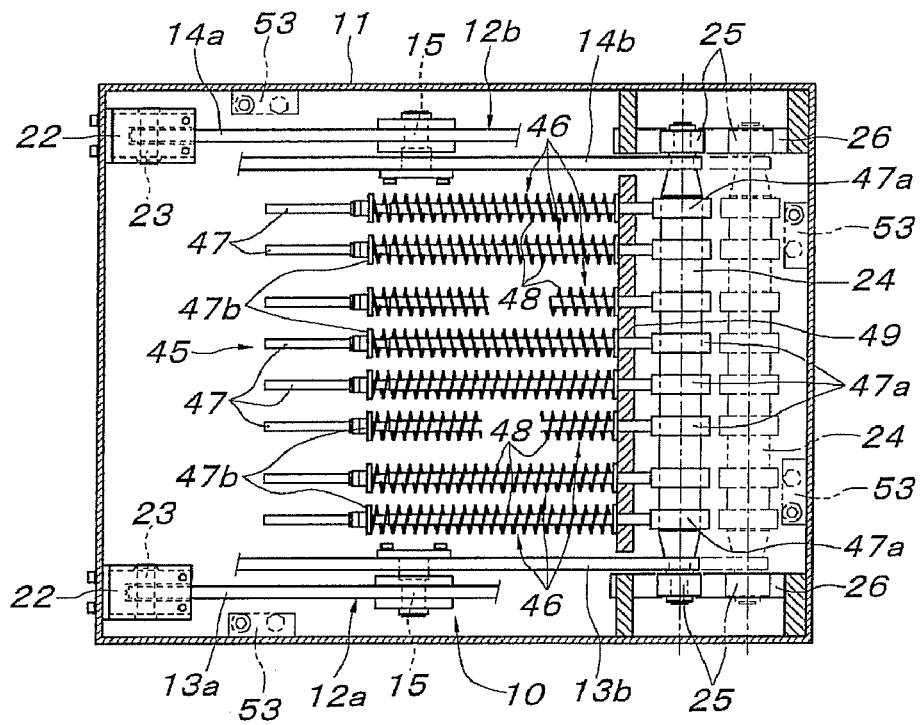
FIG. 6 is a cross sectional plan view showing an urging means when the object support base is at the rising limit position.

The conveyance carriage 1 is provided with two front and rear pairs of left and right wheels 8 (wheels without flanges to be engaged with the guide rails 2a and 2b) which roll on the pair of left and right supporting guide rails 2a and 2b and four vertical axis rollers 9a through 9d which engage with the posture restricting guide rail 3. In this embodiment, as shown in FIG. 5, the posture restricting guide rail 3 consists of a pair of left and right rail members 3a and 3b, and the vertical axis rollers 9a through 9d freely fit between the pair of left and right rail members 3a and 3b, however, it is also allowed that one vertical plate-like rail member is sandwiched by a pair of left and right vertical axis rollers. In either case, as shown in FIG. 5, the four vertical axis rollers 9a through 9d project downward from the bottom surface of the conveyance carriage 1, however, they are positioned higher than the conveyance carriage supporting level L on the traveling path side, that is, higher than the conveyance carriage supporting level L equal to the level of the wheel support surfaces of the pair of left and right supporting guide rails 2a and 2b, and the vertical axis rollers are arranged at substantially even intervals in a state that the vertical rollers 9a and 9d on both front and rear ends are positioned in both front and rear ends of the conveyance carriage 1.

On the conveyance carriage 1, an object support base 11 supported movably vertically via a crosslink mechanism 10 is provided at substantially the central position. Hereinafter, this is described in detail with reference to FIG. 3 through FIG. 6. The crosslink mechanism 10 is formed by arranging two crosslinks 12a and 12b parallel to the traveling direction so as to be parallel to each other on both lower left and right sides of the object support base 11.

The pair of left and right crosslinks 12a and 12b of the crosslink mechanism 10 consist of two links 13a and 13b and 14a and 14b whose central crossing portions are pivotally attached to each other by central fulcrum shafts 15 concentric with each other, and among the two pairs of links 13a through 14b, the front ends of the links 13a and 14a on the inner sides are pivotally attached to a pair of left and right bearing members 17 provided on a support frame 16 on the conveyance carriage 1 side by position-fixed fulcrum shafts 18 concentric with each other so as to swing up and down, and the rear ends of the links 13a and 14a are joined by a common sliding fulcrum shaft 24, and rollers 25 axially supported on both ends of the common sliding fulcrum shaft 24 are fitted to a pair of left and right front-back slide guides 26 provided on the rear end lower side of the object support base 11 so as to roll forward and rearward. Among the two pairs of links 13a through 14b, front ends of both links 13b and 14b on the outer sides are pivotally attached to a pair of left and right bearing members 22 provided just above the pair of left and right bearing members 17 on the front end lower side of the object support base 11 by position-fixed fulcrum shafts 23 concentric with each other so as to swing up and down, and the rear ends of the links 13b and 14b are joined by a common sliding fulcrum shaft 19, and rollers 20 supported on both ends of the common sliding fulcrum shaft 19 are fitted to a pair of left and right front-back slide guides 21 provided just below the front-back slide guides 26 on the support frame 16 on the conveyance carriage 1 side so as to roll forward and rearward.

Figure 9:
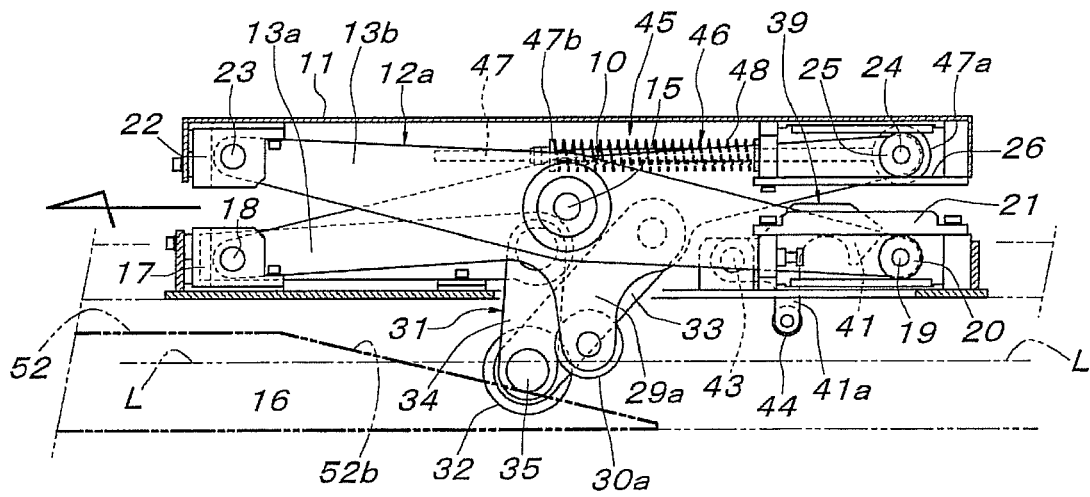
FIG. 9 is a longitudinal sectional side view of a main portion showing a state that the object support base is at a lowering limit position.

In the crosslink mechanism 10, as elevating cam follower rollers, a pair of left and right first cam follower rollers 30a and 30b and one second cam follower roller 32 are installed. The first cam follower rollers 30a and 30b are axially supported concentrically with each other on the lower ends of projections 29a and 29b provided continuously downward from both inner links 13a and 14a of the two pairs of links 13a through 14b of the pair of left and right crosslinks 12a and 12b. The projections 29a and 29b are continuously provided downward from positions near the central fulcrum shafts 15 of both inner links 13a and 14b, and when the object support base 11 is at the lowering limit position as shown in FIG. 9, the cam follower rollers 30a and 30b project downward from the conveyance carriage 1.

The second cam follower roller 32 is axially supported on a toggle link 31 provided parallel to the crosslink mechanism 10. In other words, the toggle link 31 is formed by joining a long link 33 and a short link 34 to each other by an intermediate folding fulcrum shaft 35, and each of the links 33 and 34 consists of a pair of left and right link units, and the second cam follower roller 32 is axially supported by the intermediate folding fulcrum shaft 35 between the link units of the long link 33 on the inner side. This toggle link 31 is disposed substantially at the center between the pair of left and right crosslinks 12a and 12b, and the free ends of the long link 33 are pivotally attached by a shaft-like cross member (support shaft member) 36 laid horizontally at left and right between both inner links 13a and 14a at a position slightly closer to the common sliding fulcrum shafts 19 and 24 than the central fulcrum shafts 15 of both inner links 13a and 14a constituting the crosslinks 12a and 12b. The free ends of the short link 34 are pivotally attached to bearing members 37 provided on the support frame 16 on the conveyance carriage 1 side by a support shaft 38 positioned below the central fulcrum shafts 15 of the crosslinks 12a and 12b.

Parallel to the crosslink mechanism 10, an automatic lock means 39 which locks the object support base 11 that has reached the rising limit position is provided. For this automatic lock means 39, locked portions 40 are set on the common sliding fulcrum shaft 19 laid between both outer links 13b and 14b of the crosslinks 12a and 12b, and the automatic lock means has a pair of left and right lock members 41 which automatically engage with the locked portions 40. The lock members 41 have the same structure in which they are separated to the left and right of the second cam follower roller 32 so as to be positioned at the center between the pair of left and right first cam follower rollers 30a and 30b and the one second cam follower roller 32, and the lock members are axially supported on the bearing members 42 provided on the support frame 16 on the conveyance carriage 1 side so as to swing up and down by horizontal support shafts 43 concentric with each other, and are held by gravity at locking positions at which the lock members 41 extend rearward horizontally from the support shafts 43. The lock members 41 are continuously and integrally provided with arms 41a turned downward, and on the lower ends of the arms 41a, unlocking cam follower rollers 44 are axially supported via left and right horizontal support shafts concentric with each other. The unlocking cam follower rollers 44 are positioned lower than the bottom surface of the conveyance carriage 1 and higher than the conveyance carriage supporting level L when the lock members 41 are at the locking positions.

The object support base 11 is urged upward by an urging means 45. This urging means 45 includes a plurality of urging units 46 arranged parallel at appropriate intervals laterally in the horizontal posture in a space below the object support base 11. Each urging unit 46 consists of a pulling shaft rod 47 and a compression coil spring 48 fitted around the pulling shaft rod, and each pulling shaft rod 47 penetrates horizontally a support member 49 fixed and projected below the object support base 11 parallel to a common sliding fulcrum shaft 24 at a position adjacent to the common sliding fulcrum shaft 24 when the object support base 11 is at the rising limit position shown in FIG. 4 movably axially at a right angle with respect to the common sliding fulcrum shaft 24, and one end of the pulling shaft rod is fixed and joined to a rotor 47a fitted around the common sliding fulcrum shaft 24 rotatably around the axis of the common sliding fulcrum shaft, and on the other end side, a spring bearing 47b whose axial position is adjustable is provided. Thus, the compression coil springs 48 are fitted around the pulling shaft rods 47 between the support member 49 and the spring bearings 47b, and initial compression stresses of the compression coil springs 48 move the common sliding fulcrum shaft 24 in a direction of raising the object support base 11 (direction of approaching the position-fixed fulcrum shafts 23) via the pulling shaft rods 47.

Figure 4:
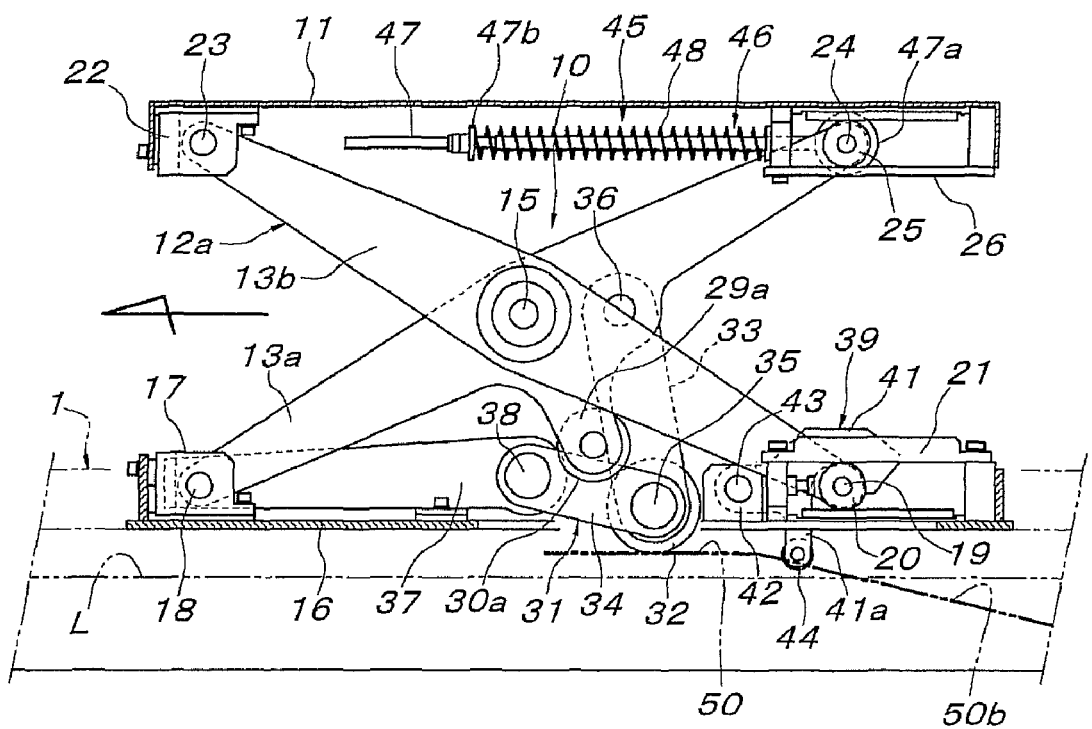
FIG. 4 is a longitudinal sectional side view showing a main portion when the object support base is at the rising limit position.

As described above, by incorporating the urging means 45, the object support base 11 is urged upward, and this urging force is set so that it can push up the empty object support base 11 on which no object is loaded to the rising limit position shown in FIG. 4, that is, the position at which the lock members 41 of the automatic lock means 39 lock the locked portions 40 of the common sliding fulcrum shaft 19 on the conveyance carriage 1 side (support frame 16 side) in the crosslink mechanism 10, however, when an object (object in a state with the smallest weight when the weight of the object changes according to the work to be applied to the object in the work zone) is loaded on the object support base 11 at the rising limit position, the object support base 11 is allowed to lower due to the loading weight applied to the object support base 11 against the urging force of the urging means 45.

According to the construction described above, when no object is loaded on the object support base 11, as shown in FIG. 4, this object support base 11 is pushed up to the rising limit position by the crosslink mechanism 10 that stands up according to an urging force of the urging means 45. At this time, the common sliding fulcrum shaft 19 on the support frame 16 side in the crosslink mechanism 10 slides horizontally to the position-fixed fulcrum shaft 18 side, and immediately before the object support base 11 reaches the rising limit position, the locked portions 40 of the common sliding fulcrum shaft 19 pass while pushing-up the lock members 41 of the automatic lock means 39 against gravity, and when the object support base 11 reaches the rising limit position, the lock members 41 swing and return downward and automatically engage with the locked portions 40 of the common sliding fulcrum shaft 19. In other words, the object support base 11 is automatically locked at the rising limit position. In this state, as shown in FIG. 4 and FIG. 5, the pair of left and right first cam follower rollers 30a and 30b have risen to the positions slightly higher than the bottom surface of the conveyance carriage 1, and one second cam follower roller 32 has risen to a position higher than the conveyance carriage level L although this position is slightly lower than the bottom surface of the conveyance carriage 1.

Figure 7:
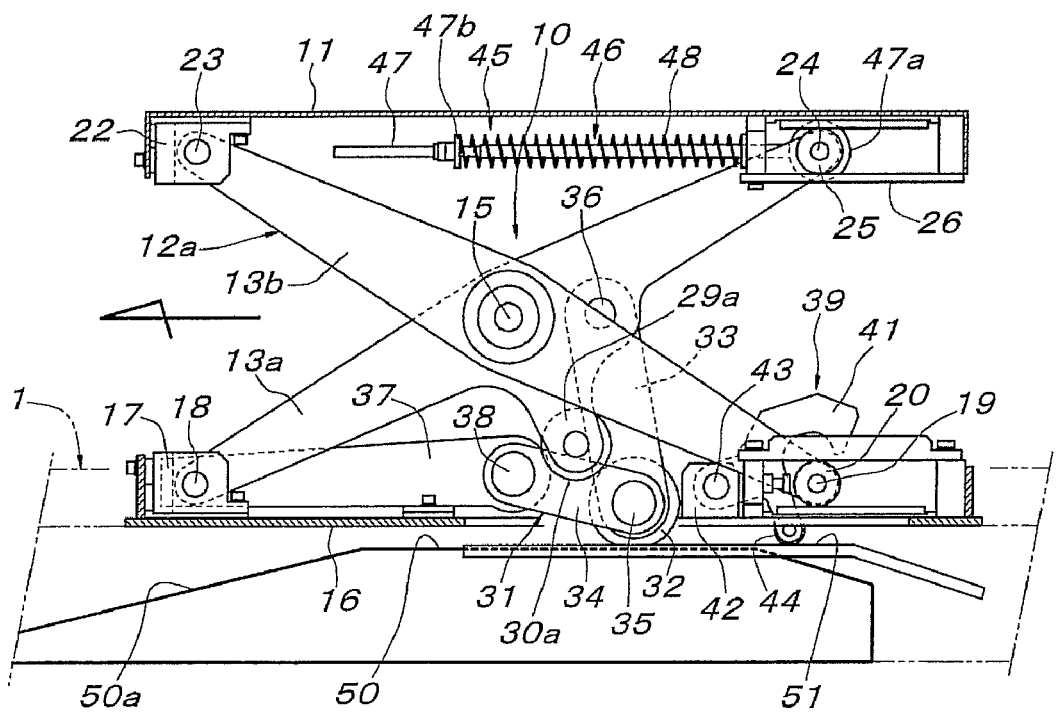
FIG. 7 is a longitudinal sectional side view of a main portion showing a state immediately before the object support base is lowered from the rising limit position.

As described above, when the conveyance carriage 1 in a state that the object support base 11 is locked at the rising limit position arrives at the front of the entrance of a work zone set in the traveling path, an object is loaded on the object support base 11 at the rising limit position. At this time, lowering of the object support base 11 due to the weight of the object is blocked by the lock members 41 of the automatic lock means 39. The conveyance carriage 1 in which the object is loaded on the object support base 11 at the rising limit position is advanced into the work zone and a predetermined work is performed for the loaded object, and when the object level must be lowered from the rising limit position according to the work contents, as shown by the imaginary lines of FIG. 5 and as shown in FIG. 7, a cam rail which can receive the second cam follower roller 32 at a risen position, specifically, a center cam rail 50 with a height to push up the object support base 11 to the rising limit position, and unlocking cam rails 51 which push up the cam follower rollers 44 of the automatic lock means 39 in a state that the center cam rail 50 can support the second cam follower roller 32, are laid on the traveling path floor.

Along with traveling of the conveyance carriage 1, first, the second cam follower roller 32 at the risen position shifts to the side above the center cam rail 50, and then, the unlocking cam follower rollers 44 of the automatic lock means 39 get onto the unlocking cam rails 51 and the lock members 41 are pushed up from the locking positions against gravity, and the lock members 41 are released upward from the common sliding fulcrum shaft 19 (locked portions 40) on the support frame 16 side of the crosslink mechanism 10, whereby the object support base 11 at the rising limit position is unlocked. From this moment, the second cam follower roller 32 is supported at substantially the same level by the center cam rail 50 just below the second cam follower roller, so that the object support base 11 is substantially left held at the rising limit position, however, along with subsequent traveling of the conveyance carriage 1, the second cam follower roller 32 shifts to a descending slope 50a (see FIG. 7 and FIG. 8) of the center cam fail 50, and accordingly, the object support base 11 lowers parallel while pushing down the crosslink mechanism 10 into a folded posture by its loading weight.

Along with the lowering of the object support base 11, the pair of left and right crosslinks 12a and 12b in the crosslink mechanism 10 rotates relative to each other around the central fulcrum shafts 15 and fall down into the horizontal postures from the standing postures, and the lowering of the object support base 11 according to the descending slope 50a of the center cam rail 50 is limited when the short link 34 of the toggle link 31 which changes in posture according to the falling-down movements of the crosslinks 12a and 12b is turned into the vertical posture. At this time, the lowering amount of the second cam follower roller 32 becomes maximum, comes closest to the floor surface of the traveling path, and separates from the terminal end of the descending slope 50a of the center cam rail 50. On the other hand, along with the falling-down movements of the crosslinks 12a and 12b, the pair of left and right first cam follower rollers 30a and 30b also lower and project downward from the bottom surface of the conveyance carriage 1. Therefore, the pair of left and right side cam rails 52 which can receive the pair of left and right first cam follower rollers 30a and 30b projecting downward from the bottom surface of the conveyance carriage 1 as shown in FIG. 8 before the second cam follower roller 32 separates from the terminal end of the descending slope 50a of the center cam rail 50, are laid on the traveling path floor surface, and the object support base 11 is supported by the side cam rails 52 via the pair of left and right first cam follower rollers 30a and 30b.

Thus, along with the traveling of the conveyance carriage 1, the pair of left and right first cam follower rollers 30a and 30b shift to descending slopes 52a (see FIG. 8) of the side cam rails 52, and accordingly, the object support base 11 lowers parallel while further pushing down the crosslink mechanism 10 into a fall-down posture by its loading weight. Then, when the object support base 11 reaches the lowering limit position shown in FIG. 9, the first cam follower rollers 30a and 30b separate from the terminal ends of the descending slopes 52a of the side cam rails 52, and the object support base 11 that has reached the lowering limit position is supported by a receiver (not shown) provided on the conveyance carriage 1 side. At this time, the short link 34 of the toggle link 31 turns into a posture slightly swinging forward from the vertical posture, and the second cam follower roller 32 has risen slightly higher than the position closest to the traveling path floor surface, and the pair of left and right first cam follower rollers 30a and 30b are at positions projecting most downward from the bottom surface of the conveyance carriage 1, that is, positions closest to the traveling path floor surface. At this time, the positions of the cam follower rollers 30a, 30b, and 32 are lower than the conveyance carriage supporting level L.

Figure 8:
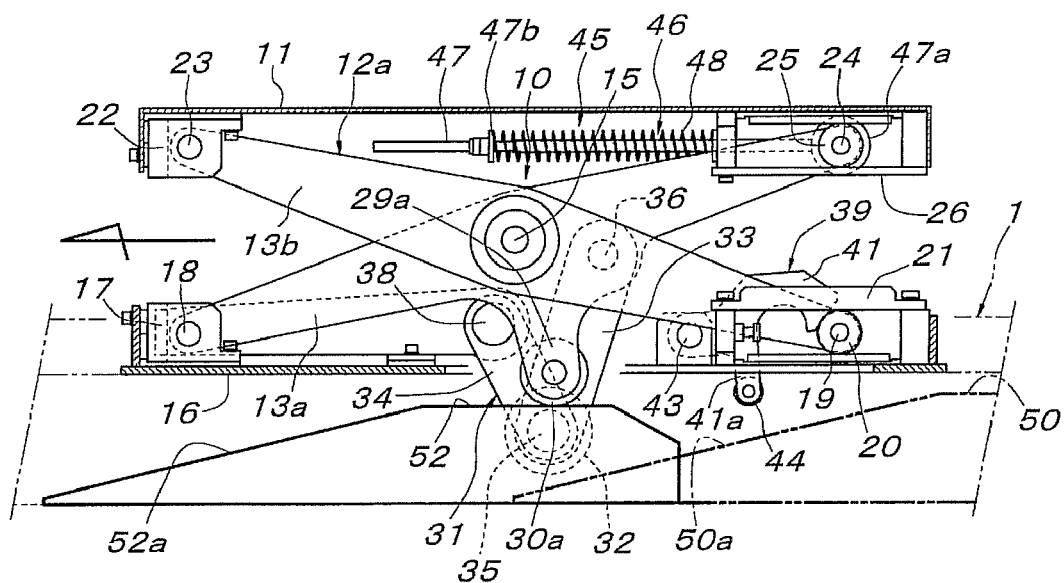
FIG. 8 is a longitudinal sectional side view of a main portion showing a state immediately before the object support base is further lowered from an intermediate height position.

As clearly understood from the description given above, along with the traveling of the conveyance carriage 1 in the work zone, the object support base 11 on which the object is loaded can be lowered from the rising limit position shown in FIG. 4 to the lowering limit position shown in FIG. 9, however, only in a predetermined section, the conveyance carriage is allowed by the center cam rail 50 to travel while holding the object support base 11 at the rising limit position, the conveyance carriage is allowed by the side cam rail 52 to travel while holding the object support base 11 at the intermediate height position shown in FIG. 8, and the conveyance carriage is allowed to travel while holding the object support base 11 at the lowering limit position without laying the cam rails. Further, it is also possible that the heights of the center cam rail 50 and the side cam rails 52 are lowered and the conveyance carriage is made travel while holding the object support base 11 at an arbitrary height between the rising limit position and the intermediate height position or an arbitrary height between the intermediate height position and the lowering limit position only in a predetermined section. Further, contrary to the description given above, when it is desired to raise the object support base 11 being lower than the rising limit position, and at this time, if the height of the object support base 11 is at the lowering limit position, as shown by the imaginary lines in FIG. 9, the object support base 11 is pushed up to, for example, the intermediate height position by standing the crosslink mechanism 10 via the first cam follower rollers 30a and 30b by an ascending slope 52b of the side cam rail 52, and on the other hand, if the height of the object support base 11 is at the intermediate height position, as shown by the imaginary lines in FIG. 4, the object support base 11 is pushed up to, for example, the rising limit position by further standing the crosslink mechanism 10 via the second cam follower roller 32 by the ascending slope 50b of the center cam rail 50.

Thus, the object support base 11 of the conveyance carriage 1 which travels in the work zone can be elevated to an arbitrary height preferable for a work to be applied to the loaded object, however, in a state that the object support base 11 is at a position higher than the lowering limit position and the first cam follower rollers 30a and 30b are supported by the side cam rails 52 or the second cam follower roller 32 is supported by the center cam rail 50, to the position-fixed fulcrum shafts 18 and the common sliding fulcrum shaft 19 on the conveyance carriage 1 side (support frame 16 side) of the crosslinks 12a and 12b in the crosslink mechanism 10, an upward force as a reaction force of the loading weight applied to the crosslink mechanism 10 from the object support base 11, that is, buoyancy is applied. When this buoyancy is greater than the weight of the conveyance carriage 1, that is, when the weight of the loaded object increases and the reaction force to be applied upward to the position-fixed fulcrum shafts 18 and the common sliding fulcrum shaft 19 becomes greater than the weight of the conveyance carriage 1, the conveyance carriage 1 itself floats up and the object support base 11 cannot be maintained at a predetermined height and cannot be pushed up to a predetermined height by the cam rails 50 and 52.

However, according to the above-described construction of the present invention having an urging means 45, the loading weight that the weight of the loaded object applies to the crosslink mechanism 10 is reduced by the upward urging force of the urging means 45, so that even when an object that is so heavy as to float the conveyance carriage 1 up for the above-described reason if this urging means 45 is not provided is loaded on the object support base 11, the urging force of the urging means 45 prevents the floating of the conveyance carriage 1 and reliably holds the object support base 11 at a predetermined height or reliably pushes it up to the predetermined height. As a matter of course, although the weight of the object to be loaded on the object support base 11 at the entrance of the work zone is small without causing floating of the conveyance carriage 1, even when the weight of the object gradually increases due to the parts assembly work to be applied to the object in the work zone and reaches the weight that causes the floating of the conveyance carriage 1 at a certain point, the urging means 45 effectively acts.

Figure 10:
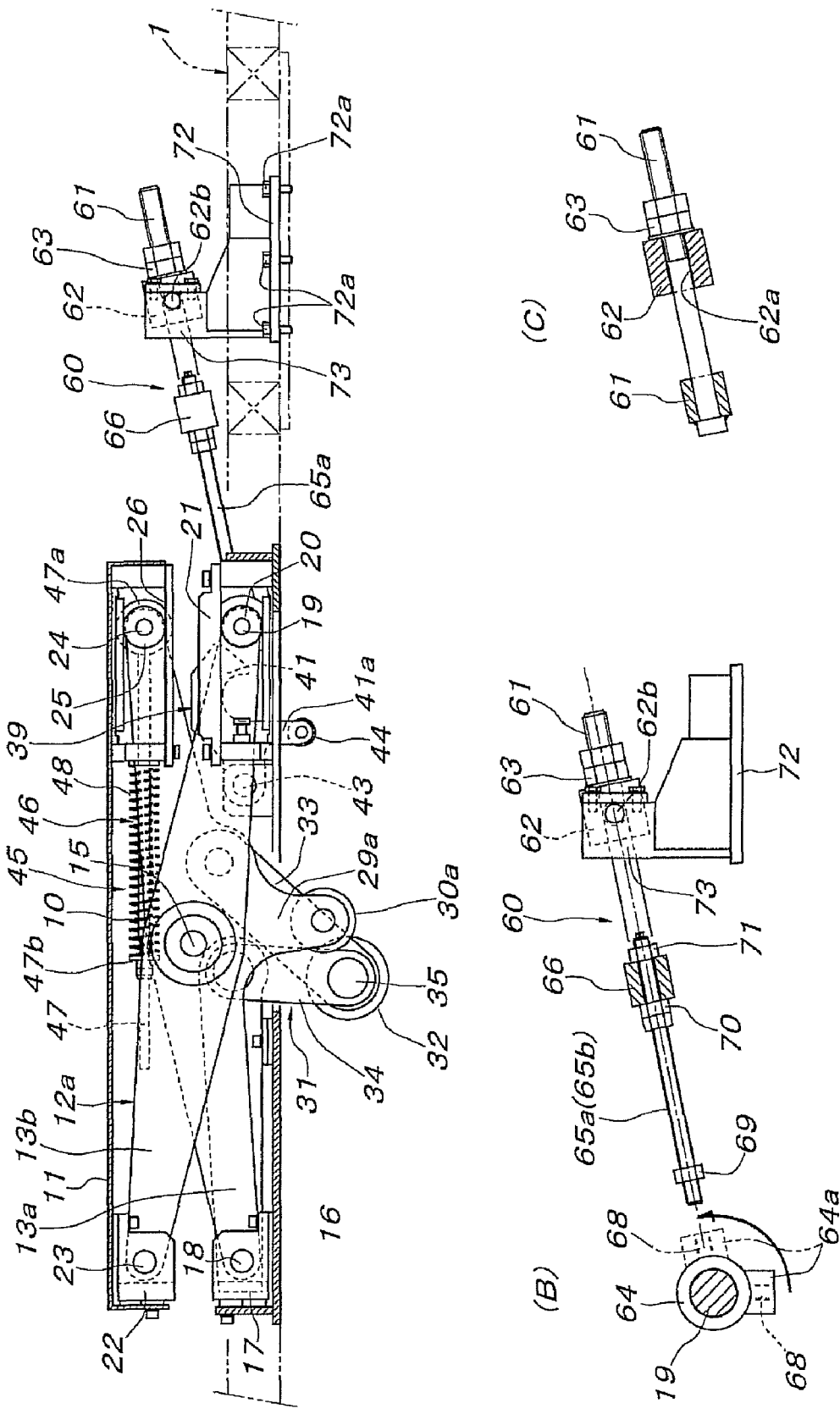
FIG. 10A is a longitudinal sectional side view of a main portion showing a state that the object support base is fixed at the lowering limit position by using a jig.
FIG. 10B is an enlarged partial longitudinal sectional side view showing a state before the jig is attached.
FIG. 10C is a longitudinal sectional side view of the jig at a screw shaft position.
Figure 11:
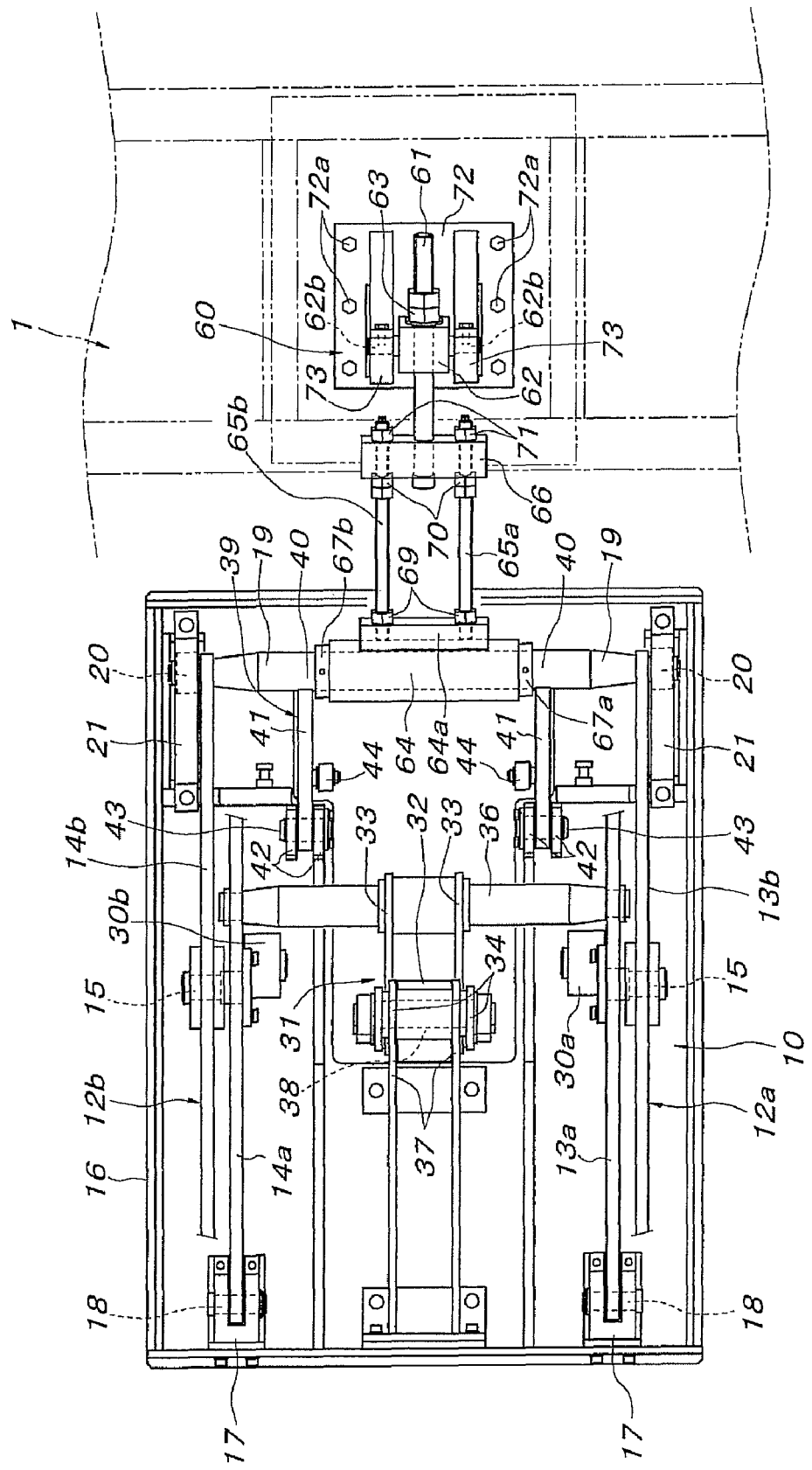
FIG. 11 is a plan view of a main portion showing a state that the object support base is fixed at the lowering limit position by using the jig.
Figure 12:
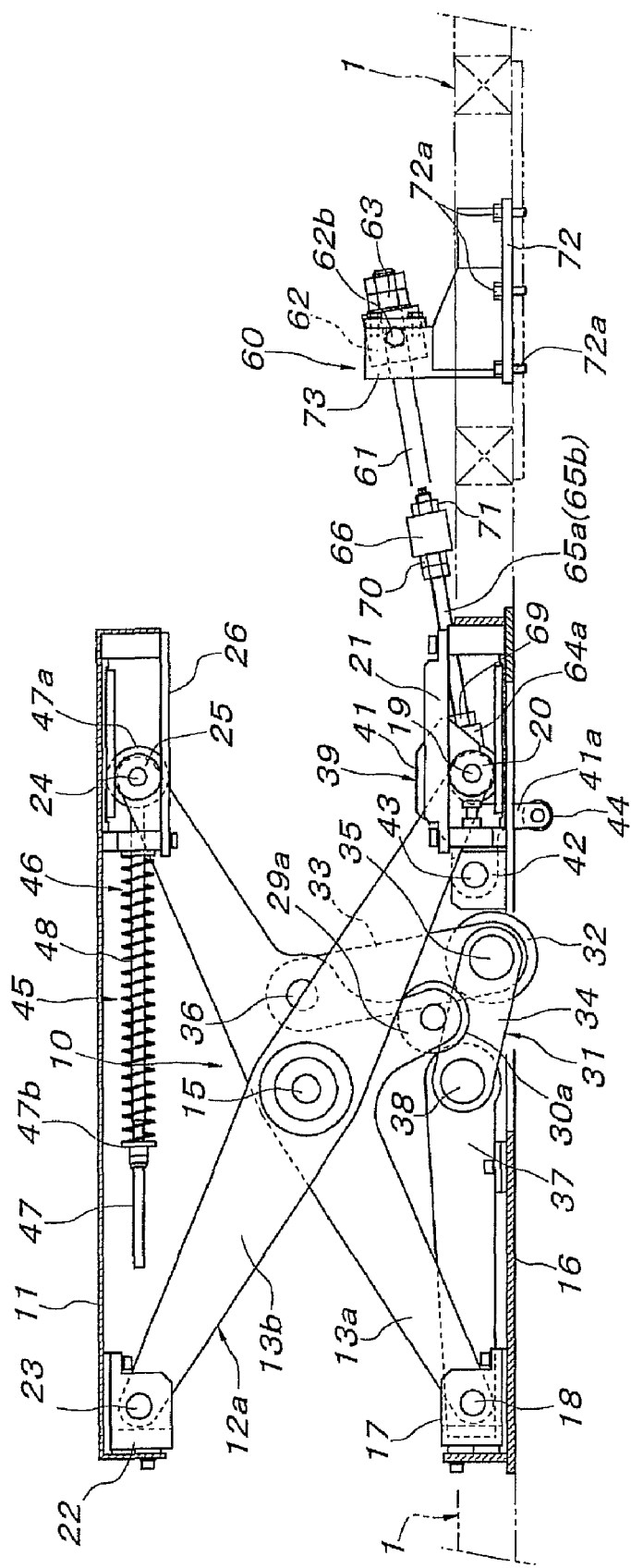
FIG. 12 is a longitudinal sectional side view of a main portion showing a state that the object support base is raised to the rising limit position by operating the jig.

The conveyance carriage 1 that can be used as described above is transported on a truck, for example, from a manufacturer of this conveyance carriage 1 to a user's site such as a car assembly plant in which a conveyance system using this conveyance carriage 1 is prepared, and to increase the loading efficiency on the transportation vehicle in this case, it is desired to lower the entire height of the conveyance carriage 1 by lowering the object support base 11 to the lowering limit position and fixing it there. In this case, the jig 60 of the present invention shown in FIG. 10 through FIG. 12 is used.

The jig 60 is for restricting a movement of the common sliding fulcrum shaft 16 on the conveyance carriage 1 (support frame 16) side in the crosslink mechanism 10 to approach the position-fixed fulcrum shafts 18 when the object support base 11 rises from a position at which the object support base 11 is at the lowering limit position, and includes a screw shaft 61 joined to the common sliding fulcrum shaft 19 side, a support member 62 provided on the conveyance carriage 1 side so that the screw shaft 61 penetrates it, and an operating nut 63 which screw-fits to the free end side of the screw shaft 61 penetrating the support member 62.

In detail, for joining the common sliding fulcrum shaft 19 and the screw shaft 61, a cylindrical body 64, joint rods 65a and 65b using two screw shafts, and an intermediate bar-like member 66 are used. The cylindrical body 64 is freely fitted to a central region except for the locked portions 40 near both ends of the common sliding fulcrum shaft 19 rotatably around the common sliding fulcrum shaft 19, and by a pair of rings 67a and 67b fixed and fitted around the common sliding fulcrum shaft 19 adjacent to both sides in the axial direction of the cylindrical body 64, the cylindrical body 64 is prevented from freely moving axially. Thus, on the cylindrical body 64, a joint rod connector 64*a* having screw holes 68 orthogonal to the axial direction of the cylindrical body 64 at two positions axially symmetric of the cylindrical body 64 is provided in a projecting manner, and the inner ends of the two joint rods (screw shafts) 65*a* and 65*b* are removably screw-joined into these screw holes 68 and fixed with lock nuts 69. The outer ends of the two joint rods (screw shafts) 65*a* and 65*b* are fixed to the intermediate bar-like member 66 by a receiving nut 70 and a fastening nut 71 which sandwich this intermediate bar-like member 66 while penetrating two left and right symmetric positions in the axial direction of the intermediate bar-like member 66. The screw shaft 61 is fixed to the intermediate bar-like member 66 by means of welding, etc., in a state that its inner end penetrates the central position in the axial direction of the intermediate bar-like member 66, and extends at a right angle with respect to the axial direction of the cylindrical body 64 opposite to the side of the joint rods 65*a* and 65*b* (outward) from the intermediate bar-like member 66.

The support member 62 has a through hole 62*a* into which an outer end screw shaft 61*a* of the screw shaft 61 is inserted and a pair of left and right support shafts 62*b* horizontal at right angles with respect to the axis of the through hole 62*a*, and is supported rotatably around the pair of left and right support shafts 62*b* between the pair of left and right bearing members 73 stood on the attaching plate 72. Then, the attaching plate 72 is removably attached onto the conveyance carriage 1 with a plurality of bolts 72*a* at a position appropriately separated laterally at a right angle from the side close to the common sliding fulcrum shaft 19 of the support frame 16 supporting the object support base 11. As a result, the joint rods 65*a* and 65*b* and the screw shaft 61 extend substantially horizontally slightly diagonally upward from the common sliding fulcrum shaft 19 in a side view.

In the state that the jig 60 is set as described above, when the operating nut 63 is rotated forward in a tightening direction, the common sliding fulcrum shaft 19 is pulled in the direction for lowering the object support base 11 via the screw shaft 61, the intermediate bar-like member 66, the joint rods 65*a* and 65*b*, and the cylindrical body 64 (direction of separating from the position-fixed fulcrum shafts 18), and when the operating nut 63 is rotated reverse in a loosening direction, the common sliding fulcrum shaft 19 is allowed to move in a direction for lowering the object support base 11 (direction of approaching the position-fixed fulcrum shafts 18).

Therefore, as described above, when it is necessary that the object support base 11 is lowered to the lowering limit position and fixed there, for example, as shown in FIG. 12, in the state that the object support base 11 is positioned at the rising limit position by the urging force of the urging means 45, while the operating nut 63 is loosened to the free end of the screw shaft 61, an attaching plate 72 is attached onto a predetermined position on the conveyance carriage 1 with bolts 72*a*, and to the joint rod connector 64*a* of the cylindrical body 64 attached in advance to the common sliding fulcrum shaft 19, the inner end screw shaft portions of the joint rods 65*a* and 65*b* are screw-joined by using the two screw holes 68 and fixed with lock nuts 69. At this time, the cylindrical body 64 rotates in a state that the joint rod connector 64*a* turns downward due to gravity as shown in FIG. 10B, so that it is rotated around the common sliding fulcrum shaft 19 so that the joint rod connector 64*a* turns to the support member 62.

When the jig 60 is set as described above, the operating nut 63 is rotated forward in a tightening direction to forcibly pull the common sliding fulcrum shaft 19 in a direction of separating from the position-fixed fulcrum shafts 18, whereby the object support base 11 is lowered, however, this operation requires a considerable rotating force and time, and applies a considerable load on the jig 60, so that in practical use, it is desirable that an appropriate means, for example, an object with a weight capable of lowering the object support base 11 held at the rising limit position by the urging force of the urging means 45 against the urging force of the urging means 45 is placed on the object support base 11 to lower the object support base 11 to the lowering limit position. At this time, along with the lowering of the object support base 11, the screw shaft 61 of the jig 60 moves in a direction of separating from the position-fixed fulcrum shafts 18 together with the common sliding fulcrum shaft 19, and this movement of the screw shaft 61 is smoothly performed according to free movement of the operating nut 63 inside a through hole 62*a* of the support member 62 in a direction of separating from the support member 62.

When the object support base 11 lowers to the lowering limit position, by rotating the operating nut 63 positioned at the free end of the screw shaft 61 in the tightening direction and bringing it into contact with the support member 62, even if the pushing-down force that had been applied to the object support base 11 is released (even if the object placed on the object support base 11 is removed), raising of the object support base 11 by the urging force of the urging means 45, that is, moving of the common sliding fulcrum shaft 19 in a direction of approaching the position-fixed fulcrum shafts 18 can be prevented by the contact between the operating nut 63 on the side interlocked with the common sliding fulcrum shaft 19 of the jig 60 and the support member 62 on the conveyance carriage 1 side. That is, as shown in FIG. 10A, the object support base 11 is fixed at the lowering limit position.

When the conveyance carriage 1 in a state that the object support base 11 is fixed at the lowering limit position by the jig 60 as described above is transported to its installation site and installed on a conveyance path of the installation site, by rotating reverse the operating nut 63 of the jig 60 in a loosening direction, the common sliding fulcrum shaft 19 can be moved away from the position-fixed fulcrum shafts 18 via the screw shaft 61, the intermediate bar-like member 66, the joint rods 65*a* and 65*b*, and the cylindrical body 64 by the retreating distance of the operating nut 63 with respect to the screw shaft 61, so that in conjunction with the reverse rotating operation of the operating nut 63, the object support base 11 gradually rises according to the urging force of the urging means 45. When the object support base 11 is thus raised to the rising limit position as shown in FIG. 12, the jig 60 that becomes unnecessary can be removed and reused for transportation of another conveyance carriage 1. The jig 60 can be removed by removing the attaching plate 72 on the support member 62 side from the conveyance carriage 1 and reverse screwing and removing the joint rods 65*a* and 65*b* from the cylindrical body 64 on the common sliding fulcrum shaft 19. The cylindrical body 64 left on the common sliding fulcrum shaft 19 side only moves laterally integrally with the common sliding fulcrum shaft 19 according to elevation of the object support base 11, and has no particular influence.

In the above-described embodiment, even if the jig 60 is not removed, it does not obstruct elevation of the object support base 11. Specifically, in a state that the operating nut 63 is loosened until the object support base 11 reaches the rising limit position or a state that the operating nut 63 thus loosened is further loosened and removed from the screw shaft 61, the screw shaft 61 just advances and retreats axially inside the through hole 62*a* of the support member 62 in conjunction with the lateral movement of the common sliding fulcrum shaft 19 according to elevation of the object support base 11, so that the presence of the jig 60 does not harmfully influence the elevation of the object support base 11, so that it is also allowed that the conveyance carriage 1 with the jig 60 left attached is used for conveyance on the conveyance path.

When the object support base 11 supported via the crosslink mechanism 11 is urged upward by the urging means 45 constructed as described above, the urging force acting in the horizontal direction of the urging means 45 is converted into an upward urging force which pushes up the object support base 11 via the crosslinks 12a and 12b, so that the smaller the standing angle of the crosslinks 12a and 12b becomes, that is, as the object support base 11 lowers, the smaller the upward urging force to push up the object support base 11 becomes, and when the object support base 11 approaches the lowering limit position, the upward urging force to push up the object support base 11 becomes extremely small.

Therefore, in the case where the urging force of the urging means 45 shown in the above-described embodiment is increased to a degree capable of pushing up the object support base 11 with no object loaded thereon from the lowering limit position to the rising limit position so that the object support base 11 with no object loaded thereon cannot be steadied at the lowering limit position, when the operating nut 63 is loosened from the state that the object support base 11 is fixed at the lowering limit position by the jig 60, the object support base 11 immediately and automatically starts rising according to the urging force of the urging means 45, and in this case, after it rises from the lowering limit position to a certain height, the upward urging force applied to the object support base 11 becomes extremely great. Therefore, in the case where the maximum weight of the object to be handled is comparatively small, when the object is loaded on the object support base 11 at the rising limit position, there is a possibility that the object support base 11 cannot be lowered by the weight of this object. Therefore, in this case, the urging force of the urging means 45 must be reduced, however, if the urging force of the urging means 45 is reduced, when the object support base 11 with no object loaded thereon is at or near the lowering limit position, the object support base 11 cannot be pushed up to the rising limit position by the urging force of the urging means 45. In other words, the object support base 11 with no object loaded thereon can be steadied at the lowering limit position. When the urging means 45 is thus constructed, even if the operating nut 63 is loosened from the state that the object support base 11 is fixed at the lowering limit position by the jig 60, the object support base 11 does not automatically start rising, so that it is necessary that the object support base 11 is pushed up from the lowering limit position by an appropriate method after the operating nut 63 is loosened to some degree.

Therefore, when the urging force of the urging means 45 is reduced so that the object support base 11 with no object loaded thereon can be steadied at the lowering limit position, it is desirable that the urging means 45 is set as a main urging means and auxiliary urging means are added thereto, and the urging means is constituted by these main urging means 45 and auxiliary urging means. The auxiliary urging means is for pushing up the object support base 11 with no object loaded thereon from the lowering limit position to a predetermined height, that is, to a height from which the urging force of the main urging means 45 can push up the object support base 11.

Figure 13:
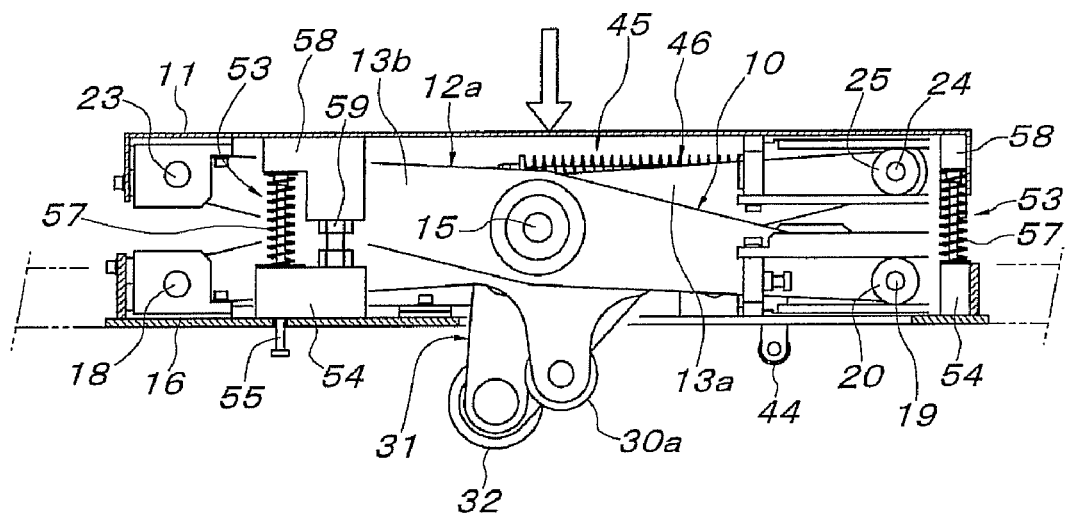
FIG. 13 is a longitudinal sectional side view of a main portion showing an embodiment employing auxiliary urging means.
Figure 14:
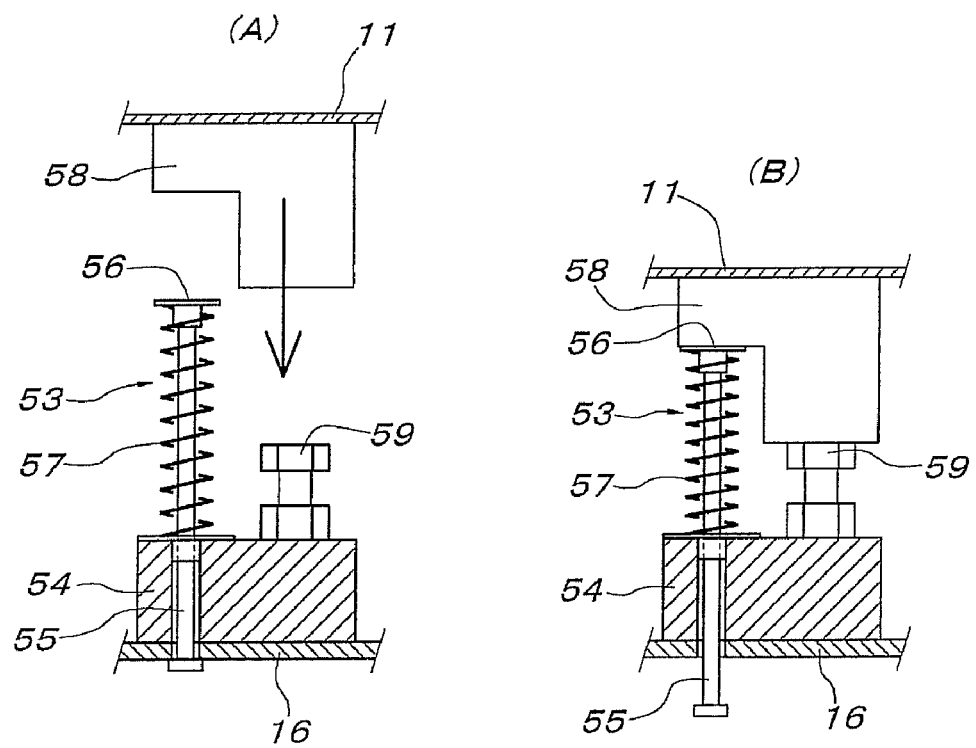
FIG. 14 show the auxiliary urging means in the embodiment.

FIG. 13 and FIG. 14 show an embodiment combined with auxiliary urging means 53. The auxiliary urging means 53 can be provided on appropriate positions on the support frame 16 side, for example, on the support frame 16 corresponding to four peripheral positions of the object support base 11 as shown each by the imaginary lines in FIG. 6, and are constituted by a spring bearing member 54 attached onto the support frame 16, a rod 55 penetrating this spring bearing member 54 movably vertically within a predetermined range, a contact panel 56 attached to the upper end of the rod 55, a compression coil spring 57 freely fitted to the rod 55 between the contact panel 56 and the spring bearing member 54, and a contact member 58 attached to the lower side of the object support base 11 so as to face the contact panel 56. In this embodiment, stopper bolts 59 which receive the object support base 11 via the contact members 58 when the object support base 11 lowers to the lowering limit position are attached to the respective spring bearing members 54.

The auxiliary urging means 53 is constructed so that in the process of lowering the object support base 11 with an object loaded thereon from a predetermined height position slightly higher than the lowering limit position to the lowering limit position, the contact members 58 on the object support base 11 side compress the compression coil springs 57 on the support frame 16 side via the contact panels 56. Therefore, when the object support base 11 reaches the lowering limit position at which the contact members 58 are received by the stopper bolts 59, the compression coil springs 57 of the auxiliary urging means 53 are compressed, and the strength of the compression reaction force in this case can push up the object support base 11 with no object loaded thereon at the lowering limit position to a predetermined height position. In detail, the resilient strength of the compression coil springs 57 can push up the object support base 11 with no object loaded thereon to a height from which the urging force of the urging means 45 as the main urging means can continuously push up the object support base 11, that is, to a predetermined height slightly lower than the height of the expanding limit of the compression coil springs 57 from the lowering limit position.

Therefore, the object support base 11 with no object loaded thereon cannot be raised from the lowering limit position by only the urging means 45 as the main urging means, however, the object support base 11 can be pushed up by the urging force of the auxiliary urging means 53 from the lowering limit position to the predetermined height position, and continuously, the urging force of the urging means 45 as the main urging means can push up the object support base 11 from the predetermined height position to the rising limit position. With this construction, without unnecessarily increasing the urging force of the urging means 45 as the main urging means, the object support base 11 with no object loaded thereon can be reliably raised from the lowering limit position to the rising limit position, so that by loosening the operating nut 63 from the state that the object support base 11 is fixed at the lowering limit position by using the jig 60, rising of the object support base 11 can be immediately and automatically started.

INDUSTRIAL APPLICABILITY

A conveyance device using a carriage relating to the present invention can be utilized in a car assembly line in which the supporting level of a supported object (car body, etc.) must be switched in the conveyance path.

What is claimed is:

1. A conveyance device using a carriage, comprising: an object support base supported movably vertically via a crosslink mechanism on a conveyance carriage capable of traveling on a fixed traveling path; elevating cam follower rollers which move up and down in conjunction with standing and falling movements of the crosslink mechanism, provided in the crosslink mechanism; and elevating cam rails which push up the elevating cam follower rollers, provided in the traveling path of the conveyance carriage, wherein an urging means which urges the object support base upward is provided, and an urging force of the urging means is set to a strength which moves up the object support base when no object is loaded on the object support base, but allows the object support base to lower according to a load of an object when the object is loaded on the object support base.

2. The conveyance device using a carriage according to claim 1, wherein the urging means is made of a horizontal coil spring which is interposed between a sliding link end on the object support base side in the crosslink mechanism and the object support base and urges the crosslink mechanism so as to stand it up.

3. The conveyance device using a carriage according to claim 2, wherein the crosslink mechanism includes a pair of crosslinks arranged parallel, and sliding link ends on the object support base side of the pair of crosslinks are joined to each other by a joint shaft, and to this joint shaft, one ends of a plurality of pulling shaft rods arranged parallel in the horizontal posture orthogonal to the joint shaft are joined, and the object support base is provided with a support member which supports the pulling shaft rods movably axially, and the crosslink mechanism is urged to stand up by compression coil springs that fit around the pulling shaft rods between the support member and free end side spring bearings of the respective pulling shaft rods.

4. The conveyance device using a carriage according to claim 2, wherein the urging force of the urging means is set to a strength which cannot move up the object support base at a lowering limit position in a state that no object is loaded on the object support base, but can move up the object support base from a predetermined height position to a rising limit position when the object support base rises from the lowering limit position to the predetermined height position.

5. The conveyance device using a carriage according to claim 2, wherein the urging force of the urging means is set to a strength which can move up the object support base having no object loaded thereon from a lowering limit position to a rising limit position.

6. The conveyance device using a carriage according to claim 5, wherein the urging means includes a main urging means which moves up the object support base that has risen to a predetermined height from the lowering limit position to the rising limit position in a state that no object is loaded on the object support base, and auxiliary urging means which moves up the object support base at the lowering limit position to the predetermined height position.

7. The conveyance device using a carriage according to claim 1, wherein the elevating cam follower rollers include first cam follower rollers directly axially supported on the links of the crosslink mechanism and a second cam follower roller axially supported on a folding portion of a toggle link interposed between the links of the crosslink mechanism and the conveyance carriage side, and the elevating cam rails include a first cam rail which pushes up the object support base to an intermediate height via the first cam follower rollers, and a second cam rail which pushes up the object support base from the intermediate height to a rising limit position via the second cam follower roller.

8. The conveyance device using a carriage according to claim 1, wherein parallel to the crosslink mechanism, an automatic lock means which holds the crosslink mechanism in a standing posture in which the object support base reaches a rising limit position is provided, and this automatic lock means is provided with an unlocking cam follower roller.

9. The conveyance device using a carriage according to claim 1, wherein a jig which holds the object support base at a lowered position against the urging force of the urging means is provided, and this jig is provided with an operating screw member which allows the object support base to move up according to the urging force corresponding to a rotating operation amount.

10. The conveyance device using a carriage according to claim 9, wherein the jig is removably attached to the conveyance carriage.

11. The conveyance device using a carriage according to claim 9, wherein in a state that the operating screw member is rotated until the object support base reaches a rising limit position or the operating screw member is removed, the object support base is allowed to move vertically between a lowering limit position and the rising limit position without a rotating operation of the operating screw member.

12. The conveyance device using a carriage according to claim 9, wherein the object support base is supported movably vertically on the conveyance carriage via the crosslink mechanism, the crosslink mechanism is provided with a pair of left and right crosslinks and a common sliding fulcrum shaft which joins sliding link ends on the conveyance carriage side of both crosslinks, and the jig includes a screw shaft joined to the common sliding fulcrum shaft side, a support member which is provided on the conveyance carriage by the side of the object support base and the screw shaft penetrates through, and an operating nut which is screw-fitted on a free end side of the screw shaft penetrating the support member, and the object support base lowers according to a tightening operation of the operating nut.

13. The conveyance device using a carriage according to claim 12, wherein a cylindrical body is freely fitted around the common sliding fulcrum shaft so as to rotate on its own axis, an intermediate member is disposed parallel to the cylindrical body at an intermediate position between the cylindrical body and the support member, the intermediate member and the cylindrical body are joined by joint rods at two positions axially of the cylindrical body, an inner end of the screw shaft is attached to the intermediate member at an intermediate position between the two joint rods, and the support member is axially supported on a bearing member stood on the conveyance carriage side rotatably around a support shaft parallel to the cylindrical body.

14. The conveyance device using a carriage according to claim 13, wherein the cylindrical body is provided with a joint rod connector which removably connects the two joint rods, and the bearing member is removably attached to the conveyance carriage, and the jig including the two joint rods, the intermediate member, the screw shaft, the operating nut, the support member, and the bearing member is made removable from the conveyance carriage.

* * * * *